US009724631B2

(12) United States Patent
Jakop

(10) Patent No.: US 9,724,631 B2
(45) Date of Patent: Aug. 8, 2017

(54) FILTER ELEMENT ADAPTOR FOR COMPRESSED AIR FILTER

(71) Applicant: INGERSOLL-RAND COMPANY, Piscataway, NJ (US)

(72) Inventor: Janez Jakop, Loqatec (SI)

(73) Assignee: Ingersoll-Rand Company, Davidson, NC (US)

( * ) Notice: Subject to any disclaimer, the term of this patent is extended or adjusted under 35 U.S.C. 154(b) by 180 days.

(21) Appl. No.: 14/431,528

(22) PCT Filed: Oct. 10, 2013

(86) PCT No.: PCT/US2013/064414
§ 371 (c)(1),
(2) Date: Mar. 26, 2015

(87) PCT Pub. No.: WO2014/059195
PCT Pub. Date: Apr. 17, 2014

(65) Prior Publication Data
US 2015/0251120 A1 Sep. 10, 2015

Related U.S. Application Data

(60) Provisional application No. 61/712,052, filed on Oct. 10, 2012.

(51) Int. Cl.
*B01D 46/00* (2006.01)
*B01D 46/24* (2006.01)

(52) U.S. Cl.
CPC ...... *B01D 46/0005* (2013.01); *B01D 46/2411* (2013.01); *B01D 2201/301* (2013.01)

(58) Field of Classification Search
CPC ............ B01D 46/0004; B01D 46/2411; B01D 46/2414; B01D 29/117; B01D 29/15;
(Continued)

(56) References Cited

U.S. PATENT DOCUMENTS 4,172,798 A 10/1979 Kronsbein
4,701,258 A 10/1987 Billiet
(Continued)

FOREIGN PATENT DOCUMENTS

DE 10052524 A1 4/2002
EP 1343574 B1 10/2004
(Continued)

OTHER PUBLICATIONS

European Patent Office, International Search Report and Written Opinion, PCT/US2013/064399, Jan. 3, 2014.
(Continued)

*Primary Examiner* — Robert Clemente
(74) *Attorney, Agent, or Firm* — IpHorgan Ltd.

(57) ABSTRACT

A filter head adaptor for a compressed air filter. The filter head adaptor capable of modifying a filter head to accommodate a variety of different style filter elements. The filter head adaptor including a main body connector, a filter element connector, and a second inlet channel in fluid communication between the main body connector and the filter element connector, the main body connector is adapted for coupling to the adaptor connector of the main body, whereby the main body connector is adapted for coupling to a filter head. The invention includes contemplates requiring a reduced inventory of filter heads and filter bodies for a plurality of filter elements, as the appropriate filter head adaptor may be selected which presents a particular filter element connector which matches that of the filter element intended to be used.

14 Claims, 6 Drawing Sheets

(58) Field of Classification Search
CPC .............. B01D 29/21; B01D 2201/291; B01D 2201/295; B01D 2201/296; B01D 2201/301; B01D 2201/302; B01D 46/0005
See application file for complete search history.

(56) References Cited

U.S. PATENT DOCUMENTS

| | | | |
|---|---|---|---|
| 5,053,129 | A | 10/1991 | Kitson |
| 5,580,456 | A | 12/1996 | Bowlsbey |
| 6,015,492 | A | 1/2000 | Popoff |
| 6,391,197 | B1 | 5/2002 | Billiet |
| 6,409,786 | B1 | 6/2002 | Wright |
| 6,440,201 | B1 | 8/2002 | Billiet |
| 6,461,397 | B1 | 10/2002 | Billiet |
| 6,663,685 | B2 | 12/2003 | Wright |
| 6,692,639 | B1 | 2/2004 | Spearman |
| D497,972 | S | 11/2004 | Reynolds |
| 6,936,084 | B2 | 8/2005 | Schlensker |
| 7,344,581 | B2 | 3/2008 | Pearson |
| 7,442,220 | B2 | 10/2008 | Pearson |
| 7,445,651 | B2 | 11/2008 | Lane |
| 7,503,952 | B2 | 3/2009 | Lane |
| 7,766,989 | B2 | 8/2010 | Lane |
| 7,833,304 | B2 | 11/2010 | Pearson |
| 7,857,970 | B2 | 12/2010 | Wright |
| 7,964,010 | B2 | 6/2011 | Lane |
| 7,964,011 | B2 | 6/2011 | DeLillo |
| 8,002,865 | B2 | 8/2011 | Lane |
| 2008/0250765 | A1 | 10/2008 | Lane |
| 2009/0127184 | A1 | 5/2009 | Pauwels |
| 2010/0058930 | A1* | 3/2010 | Schuster ............ B01D 46/0004 96/421 |
| 2010/0089813 | A1 | 4/2010 | Tellier |
| 2010/0154371 | A1 | 6/2010 | Bittle |
| 2011/0049035 | A1 | 3/2011 | Wise |
| 2011/0100893 | A1 | 5/2011 | Kocksch |

FOREIGN PATENT DOCUMENTS

| | | |
|---|---|---|
| EP | 1870152 A1 | 12/2007 |
| EP | 1967247 A1 | 9/2008 |
| EP | 1804954 B2 | 6/2010 |
| EP | 2188032 B1 | 5/2011 |
| NL | 2004925 | 12/2011 |
| WO | 9937386 A1 | 7/1999 |
| WO | 2009012010 A1 | 1/2009 |

OTHER PUBLICATIONS

The International Bureau of WIPO, International Preliminary Report on Patentability, Chapter I, PCT/US2013/064399, Apr. 15, 2015.

* cited by examiner

FILTER ELEMENT ADAPTOR FOR COMPRESSED AIR FILTER

CROSS-REFERENCE TO RELATED APPLICATIONS

This application is a national phase application of international application no. PCT/US2013/064414, filed Oct. 10, 2013, which claims the benefit of U.S. provisional application No. 61/712,052, filed Oct. 10, 2012, the entire contents of which both are hereby incorporated by reference.

FIELD OF THE INVENTION

The present invention relates to a compressed air filter, and in particular, an adaptor for coupling a filter element and filter head in a compressed air filter.

BACKGROUND OF THE INVENTION

The prior art includes general air treatment technology, such as compressed air filters, dust filters, general purpose filters, coalescing filters and activated carbon filters. The compressed air filters may include a filter body containing a filter element which couples to a filter head. The filter head typically includes the fittings for connecting the filter into a compressed air system. The filter element requires periodic replacement to maintain the performance of the compressed air system. In particular, a standard schedule for filter element replacement significantly lowers the pressure drop loss across the compressed air system.

To accommodate ease in replacement of the filter element, the fittings for coupling to the compressed air system are generally limited to the filter head. The filter body contains the filter element and, with the exception of the drain, includes no attachments to the compressed air system. Thus, the filter body is designed for easy removal from the compressed air system together with the filter element for easy replacement of the filter element.

The prior art filter heads include various different configurations, including the ports, chamber and interface to the filter element and filter body. Each style of configuration of filter head requires a filter body and filter element with a corresponding configuration in order to provide a sealed filter with optimum flow characteristics.

The main problem with the prior art is the required manufacturing of each component part and the corresponding inventory required for each part, to support the assembly of the various systems.

SUMMARY OF THE INVENTION

It is an object of the present invention to provide and accommodate various style and size filter elements and overall filter systems and yet reduce the overall component count.

It is a further object of the present invention to reduce the inventory of filter components.

It is still a further object of the present invention to provide an adaptor for a filter which may be used for more than one style filter element.

It is yet a further object of the present invention to provide a filter head with a more cost efficient smooth fluid flow feature.

The present invention provides a filter head adaptor for a compressed air filter. The filter head adaptor is capable of adapting a filter head to accommodate a variety of different style filter elements. The filter head adaptor including a main body connector, a filter element connector, and a second inlet channel in fluid communication between the main body connector and the filter element connector, the main body connector is adapted for coupling to the adaptor connector of the main body, whereby the main body connector is adapted for coupling to a filter head.

The filter head includes a main body, the main body including an inlet port, an adaptor connector, a first inlet channel in fluid communication between the inlet port and the adaptor connector, a filter body connector, an outlet port, and an outlet channel in fluid communication between the filter body connector and the outlet port, whereby the first and second inlet channels form a continuous inlet channel between the inlet port and the filter element connector.

The adaptor and filter head main body allow a cost efficient design of a filter head which provides an inlet channel having a smooth fluid flow channel.

Considering the above comments, it will be appreciated that with an inventory of a single filter head, a single filter bowl, and a plurality of adaptors, the inventory will accommodate the assembly of a filter for any one of a plurality of filter elements.

DETAILED DESCRIPTION OF THE INVENTION

Figure 1:
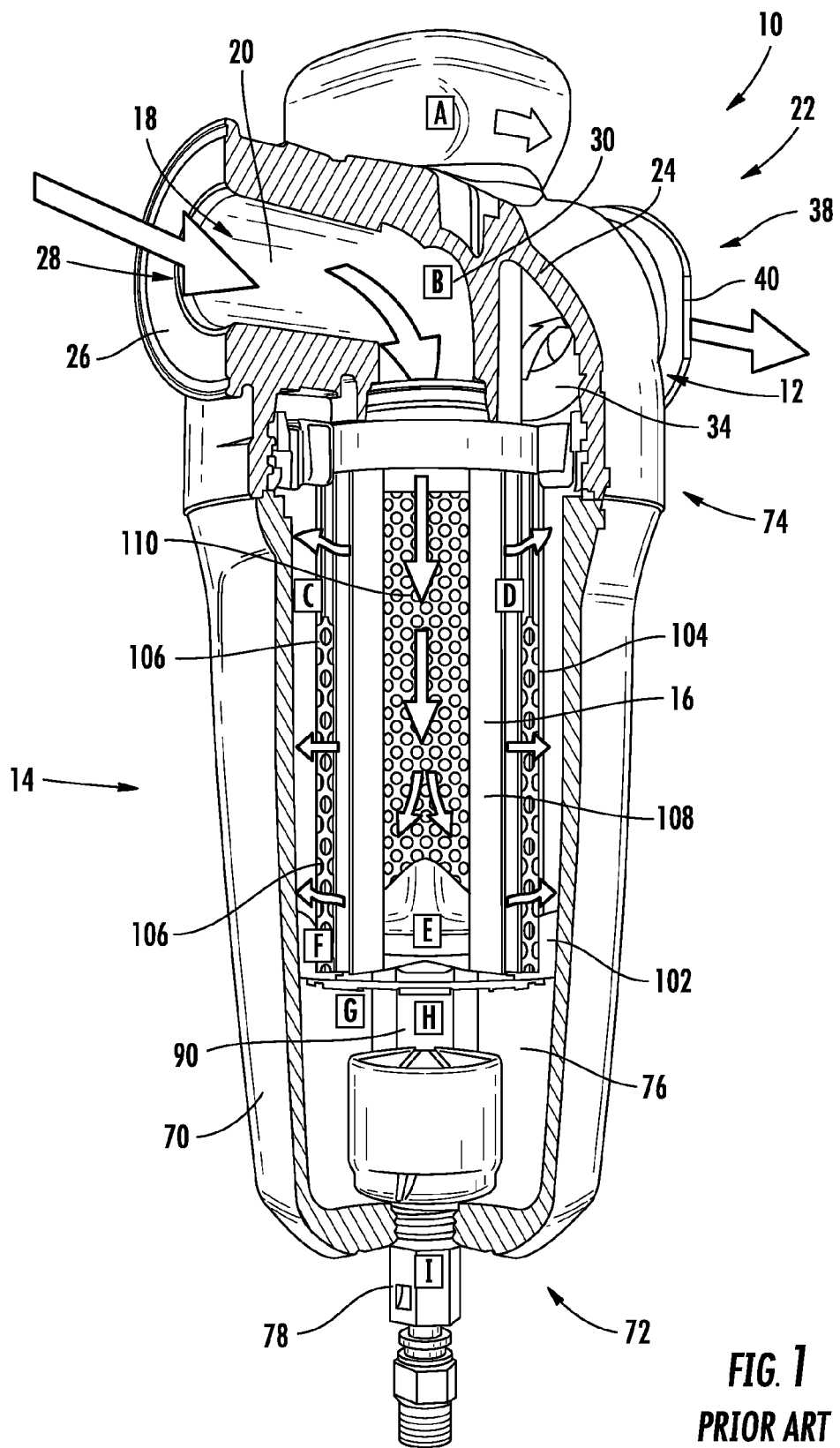
FIG. 1 is a part perspective view and part cross-sectional view of a prior art compressed air filter.
Figure 2:
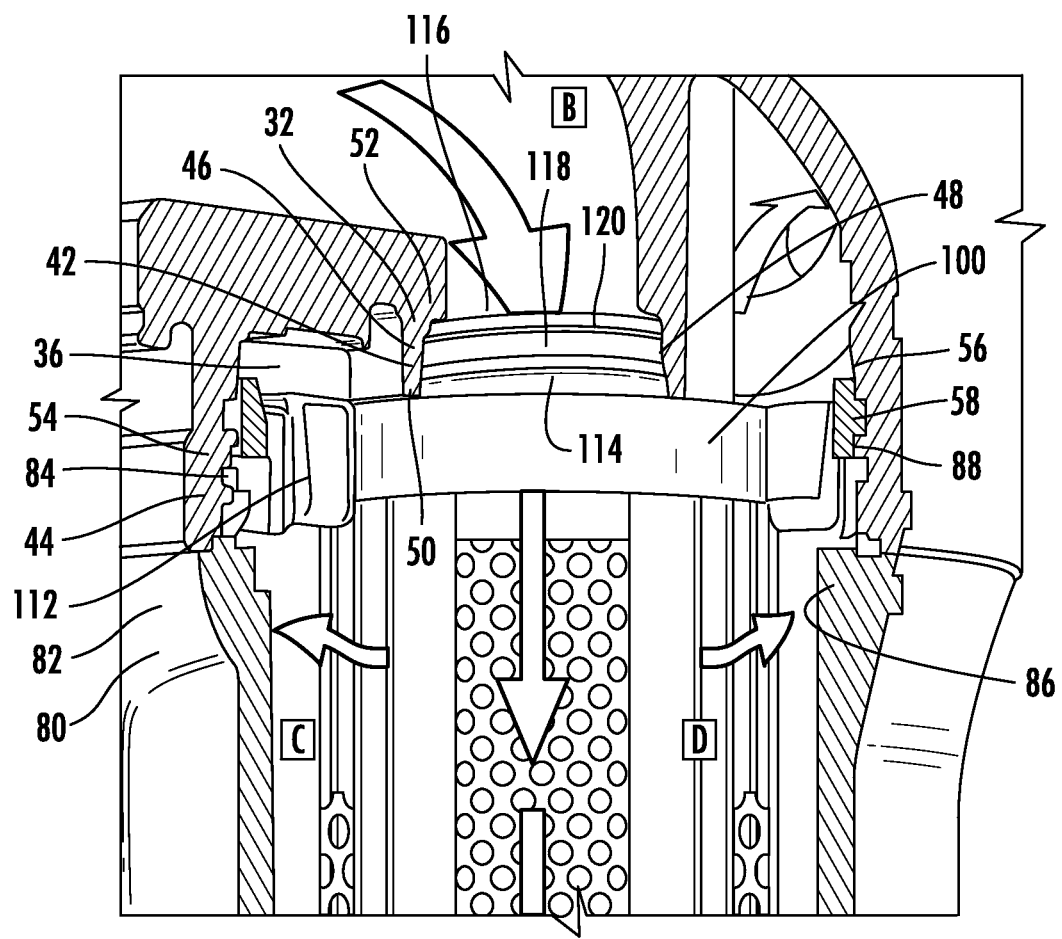
FIG. 2 is an enlarged view of a portion of the part perspective view and part cross-sectional view of the prior art compressed air filter of FIG. 1.

FIG. 1 and FIG. 2 show a prior art compressed air filter 10. The compressed air filter 10 includes a filter head 12, a filter body 14 and a filter element 16. The filter head 12 includes an inlet passage or channel 18 formed by an inlet wall 20 and an outlet passage or channel 22 formed by an outlet wall 24. The inlet passage 18 includes a first end 26 in fluid communication with an inlet port 28 and a second end 30 in fluid communication with a first filter element port 32 (FIG. 2). The outlet passage 22 includes a first end 34 in fluid communication with a second filter element port 36 (FIG. 2) and a second end 38 in fluid communication with an outlet port 40.

The filter head 12 further includes a filter element connector 42 and a filter body connector 44. The filter element connector 42 includes a first cylindrical collar 46 which forms the first filter element port 32. The first cylindrical collar 46 extends downward from the filter head 12 and includes an inner cylindrical wall 48 and a lower annular edge 50. A first abutment or stop 52 is provided at an upper end of the inner cylindrical wall 48. The first cylindrical collar 46 includes an outside diameter, an inside diameter, and a length between the stop 52 and lower annular edge 50. The filter body connector 44 includes a second cylindrical collar 54 having an inside diameter which is larger than an outside diameter of the first cylindrical collar 46. The second cylindrical collar 54 includes an internal wall 56 having a thread 58. The second filter element port 36 is generally annularly shaped and is formed between the first cylindrical collar 46 and the second cylindrical collar 54.

The filter body 14 includes a generally cylindrical body 70 having a closed lower end 72 and an open upper end 74 which define a cavity 76. The closed end 72 includes a drain line 78. The upper end 74 includes an annular collar 80 having an outer wall 82 with a thread 84 and an inner wall 86 with a ledge 88. Vertical ribs 90 are formed within the cavity 76 of the cylindrical body 70 at the closed lower end 72.

The filter element 16 includes an upper end cap 100 and a lower end cap 102. The end caps 100, 102 may be made of nylon or another material. A cylindrical mesh wall 104 extends between the upper end cap 100 and the lower end cap 102. The cylindrical mesh wall 104 includes a plurality of openings 106. A cylindrical filter media 108 is enclosed within the end caps 100, 102 and cylindrical mesh wall 104. The filter media 108 forms an inner cylindrical fluid channel 110 between the upper end cap 100 and the openings 106 in the cylindrical mesh wall 104. Radial extensions 112 extend outwardly from the upper end cap 100. A collar 114 extends upward from the upper end cap 100. The collar 114 includes an upper edge 116 and an outer wall 118, the outer wall 118 provided with two o-rings 120. The collar 114 includes an outer diameter, and inner diameter and the outer wall 118 includes a length.

The prior art compressed air filter 10 is assembled by inserting the filter element 16 into filter body 14. The lower end cap 102 will abut the vertical ribs 90 and the radial extensions 112 will abut the ledge 88. The combination filter body 14 and filter element 16 is then inserted into the filter head 12 and threaded into place with the threads 84 of the filter body 14 engaging the threads 58 of the filter head 12. The advancement of the filter body 14 and filter element 16 into the filter head 12 will be stopped by full engagement of the threads 84, 58 and the upper edge 116 with the first abatement 52, and the lower annular edge 50 with the upper end cap 100.

Figure 3:
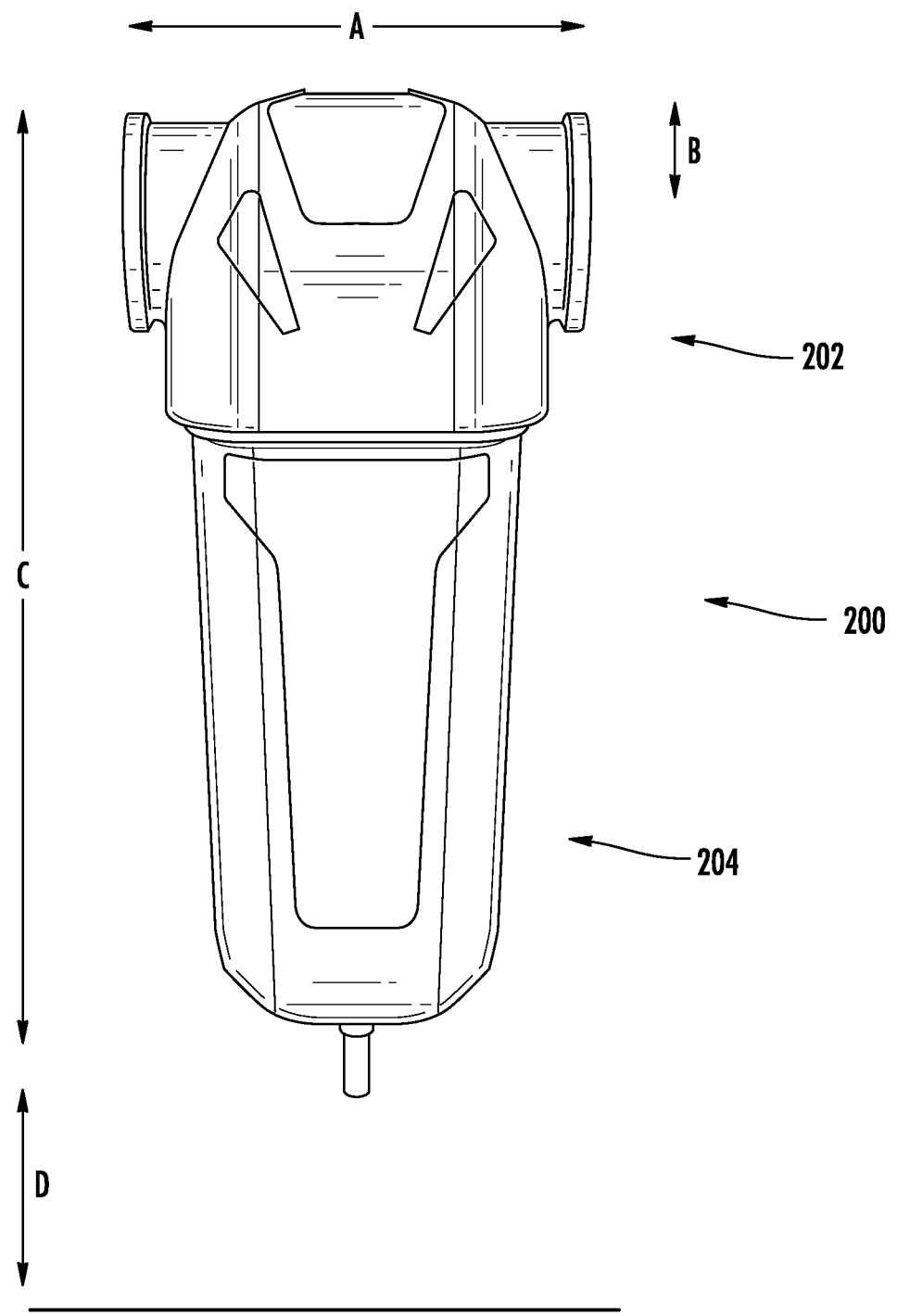
FIG. 3 is an elevated view of a compressed air filter in accordance with the present invention, showing the filter head and filter body.

FIG. 3 shown a compressed air filter 200 in accordance with the present invention. The compressed air filter 200 includes a filter head 202 and a filter body 204. The compressed air filter 200 shares many features with the compressed air filter 10. The same reference numerals are used to show the similar features. However, as shown in FIG. 4, the present invention includes a filter head 202 having an adaptor 300.

The adaptor 300 is shown in exploded view. However, it will be appreciated that the adaptor 300 is secured to the filter head 202 via a fasteners, such as screws 302. The screws 302 are received by bores or holes 304 which extend through the adaptor 300. The bores 304 may be formed with an inside diameter larger than the outside diameter of the screws 302. Instead of fasteners, the adaptor 300 may be secured to the head 202 via a snap-fitted arrangement, a threaded connection, an adhesive attachment, or any other means of securing the adaptor to the filter head as understood by one skilled in the art. The filter head 202 includes a main body 306 generally defined by an outer wall 308 and a top wall 310 which together define a cavity 312 in the main body 306. The filter head 202 includes a rim 314 which in the embodiment shown in FIG. 4 presents an elliptical profile. The rim 314 includes a groove (FIG. 7) which receives a seal, such as O-ring 316. Threaded bores or openings 318 surround the rim 314 and are adapted to receive a respective screw 302. As shown in FIG. 5, the adaptor 300 includes a mating surface 320 for sealing engagement with the rim 314 and O-ring 316.

It will be appreciated that the rim 314 and the adaptor 300 define in part the inlet passage 18 of the filter head 202. In particular, FIG. 4 shows that the filter head 202 includes a wall 322, in this instance, providing an elliptical profile. The wall 322 includes an opening 324 which further defines the inlet passage 18. The wall 322 is bordered at one end by the rim 314 and at the other end by an end wall 326. The shape of the wall 322 and other portions of the inlet passage 18 define a transition portion 328 of the inlet passage 18, and are designed, in part, to provide excellent fluid flow through the transition portion 328.

Figure 4:
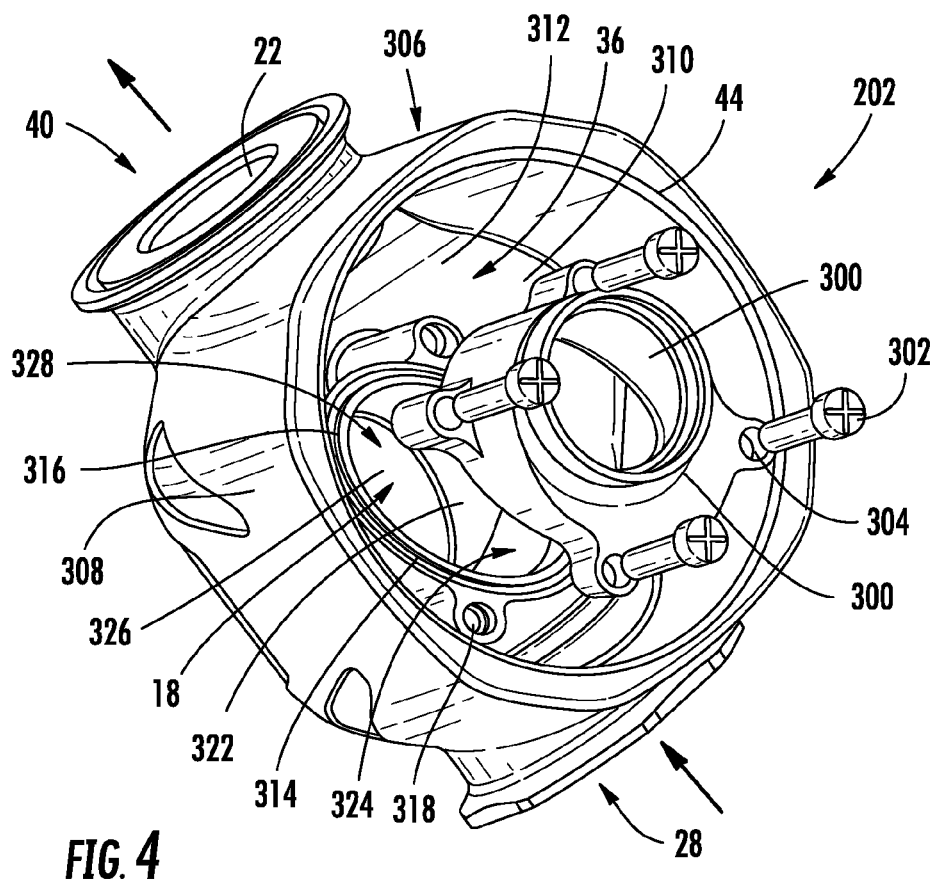
FIG. 4 is an exploded view of the filter head of FIG. 3, including an adaptor and means for fastening, in accordance with the present invention.
Figure 5:
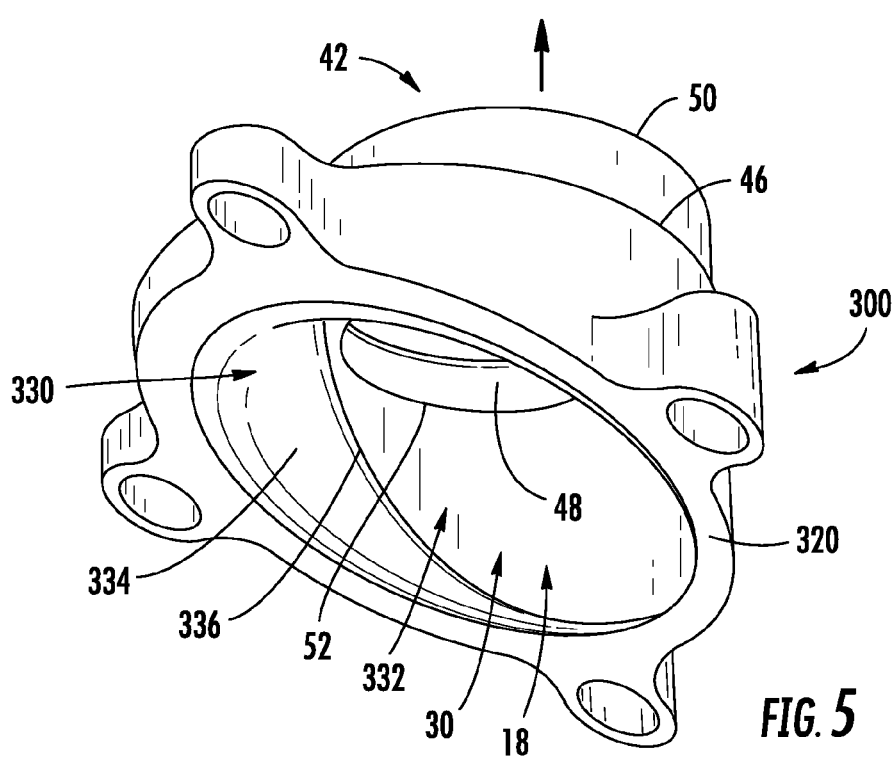
FIG. 5 is a perspective view of the adaptor shown in FIG. 4 in accordance with the present invention.

FIGS. 4 and 5 shows that the adaptor 300 defines two primary fluid flow profiles within the inlet passage 18, namely, an initial fluid flow profile 330 and a final fluid flow profile 332. The initial fluid flow profile 330 is defined in part by the mating surface 320 of the adaptor 300. The mating surface 320 presents an elliptical and inclined profile which corresponds to the shape of the rim 314. A wall 334 extends from the mating surface 320 initially with a similar elliptical profile. However, it can be seen that the wall 334 extends in a smooth curved like manner, changing the profile of the inlet passage 18. The wall 334 meets a transition portion 336 which separates the initial fluid flow profile 330 and the final fluid flow profile 332. In the embodiment shown in FIGS. 4 and 5, the final fluid flow profile 332 is shown to be substantially cylindrical. As noted above, it will be appreciated that various profiles may be chosen to enhance the fluid flow characteristics of the filter, and also to accommodate the various style filter elements.

Figure 6:
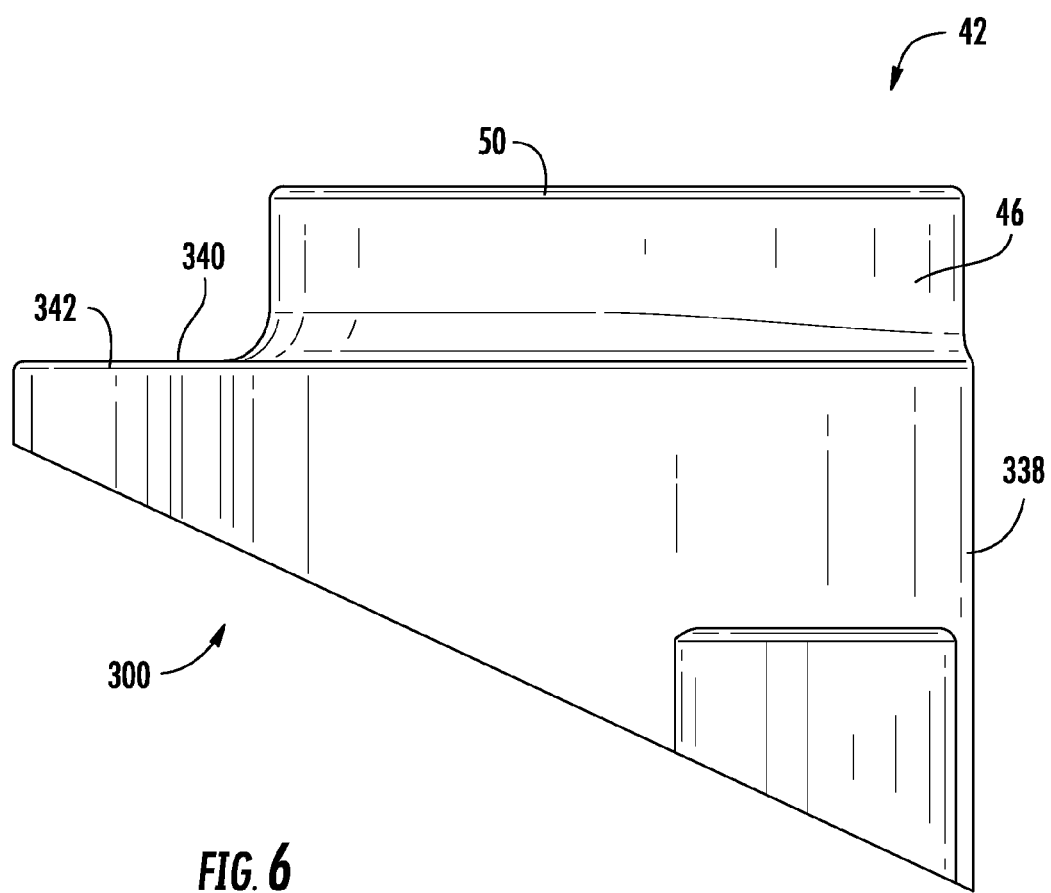
FIG. 6 is an elevated view of the adaptor shown in FIGS. 4 and 5, in accordance with the present invention.

FIGS. 4-6 show that the adaptor 300 includes the filter element connector 42 having the first cylindrical collar 46 and the lower annular edge 50, and the first abutment or stop 52. It will be appreciated that the adaptor 300 may be designed to provide a particular style filter element connector 42 dependent upon the filter element in which it is intended to mate. Thus, various different adaptors 300 may be provided, each having a particular style filter element connector 42. It is anticipated that in some embodiments, the filter element connector 42 may be designed to mate with more than one filter element.

FIG. 6 shows that the adaptor 300 includes a main body portion 338. The main body portion 338 is shown to include a flat planar surface 340. The main body portion 338 includes an extension portion 342 which largely corresponds to the elliptical shape of the mating surface 320 and rim 314.

The adaptor 300 allows the use of one filter housing, e.g., combination filter head 202 and filter body 204, for two different customers. Each adaptor 300 may provide one of several different connection diameters for different filter elements 16. In addition, the nature of the adaptor 300 allows for designing a smooth flow feature in the assembled combination head 202 and adaptor 300. Such design feature is much more difficult to achieve in a prior art one piece head.

Figure 7:
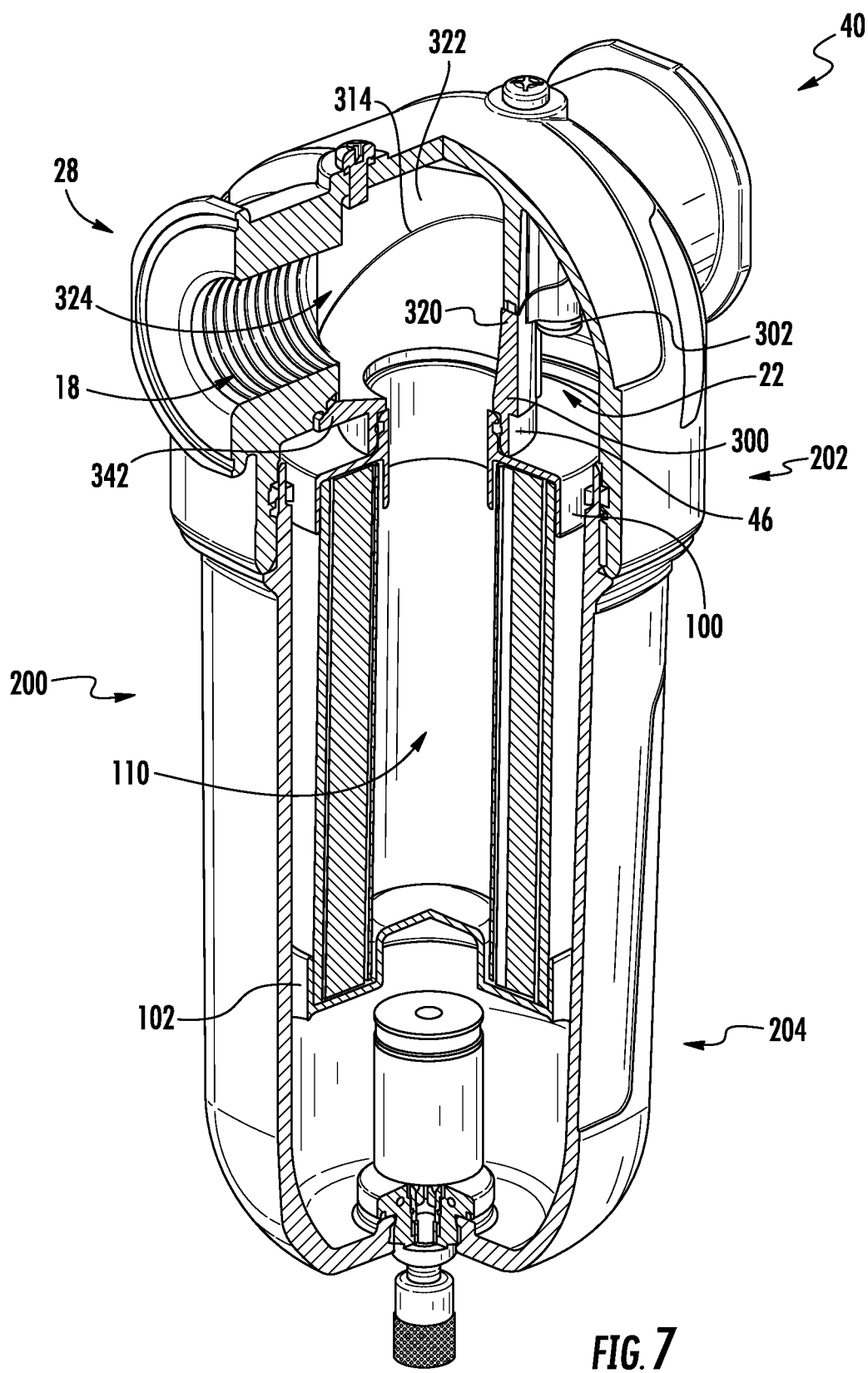
FIG. 7 is a part perspective view and part cross-sectional view of another embodiment of a compressed air filter, in accordance with the present invention.

FIG. 7 is a part perspective view and part cross-sectional view of another embodiment of a compressed air filter 200, in accordance with the present invention. As noted above, the rim 314 includes a groove. The adaptor 300 shown in FIG. 7 includes a flange which is received by the groove of the rim 314, providing a tongue-and-groove arrangement.

While the present invention has been described in connection with a specific application, this application is exemplary in nature and is not intended to be limiting on the possible applications of this invention. It will be understood that modifications and variations may be effected without departing from the spirit and scope of the present invention. It will be appreciated that the present disclosure is intended as an exemplification of the invention and is not intended to limit the invention to the specific embodiments illustrated and described. The disclosure is intended to cover, by the appended claims, all such modifications as fall within the scope of the claims.

I claim:

1. A filter head adaptor (300) for a compressed air filter, the filter head adaptor capable of modifying a filter head to accommodate a variety of different style filter elements, the filter head adaptor comprising: a main body connector (320), a filter element connector (42), and a second inlet channel in fluid communication between the main body connector (320) and the filter element connector (42), the main body connector (320) is adapted for coupling to an adaptor connector (314) of a main body (306) of the filter head (202), and wherein the adaptor includes a mating surface (320), wherein the mating surface is inclined with respect to an orthogonal axis extending through the filter head, and the second inlet channel defines an elliptical shape adjacent the mating surface.

2. The filter head adaptor of claim 1, wherein the second inlet channel of the adaptor includes a wall which defines an initial fluid flow profile (330) and a final fluid flow profile (332), separated by a transition portion (336), the final fluid flow profile is substantially cylindrical in shape.

3. The filter head adaptor of claim 1, wherein the adaptor (300) is formed by die cast.

4. The filter head adaptor of claim 1, wherein the adaptor (300) is plastic.

5. A filter head adaptor (300) for a compressed air filter, the filter head adaptor capable of modifying a filter head to accommodate a variety of different style filter elements, the filter head adaptor comprising: a main body connector (320), a filter element connector (42), and a second inlet channel in fluid communication between the main body connector (320) and the filter element connector (42), the main body connector (320) is adapted for coupling to an adaptor connector (314) of a main body (306) of the filter head (202), wherein the adaptor includes a main body portion (338) having a flat planar surface (340), the main body portion and flat planar surface define an extension portion (342), the main body portion includes holes (304) for receiving a respective screw (302).

6. A filter head (202) for a compressed air filter, the filter head comprising: a main body (306), the main body including an inlet port (28), an adaptor connector (314), a first inlet channel in fluid communication between the inlet port (28) and the adaptor connector (314), a filter body connector (44), an outlet port (40), and an outlet channel (22) in fluid communication between the filter body connector and the outlet port; and an adaptor (300) having a main body connector (320), a filter element connector (42), and a second inlet channel in fluid communication between the main body connector and the filter element connector, the main body connector is adapted for coupling to the adaptor connector (314) of the main body (306), whereby the first and second inlet channels form a continuous inlet channel between the inlet port (28) and the filter element connector (42), and wherein the adaptor connector (314) and the adaptor (300) include respective mating surfaces, wherein the mating surfaces are inclined with respect to an orthogonal axis extending through the filter head (202), and the first inlet channel and second inlet channel define an elliptical shape adjacent the respective mating surfaces.

7. The filter head of claim 6, further comprising a plurality of adaptors (300), each adaptor having a filter element connector (42) with a unique configuration adapted for coupling to a respective filter element (16), whereby the main body (306) may be used for a variety of different filter elements (16) by selecting the appropriate adaptor (300).

8. The filter head of claim 6, wherein the adaptor (300) is secured to the main body (306) via a fastener (302) or other means for securing.

9. The filter head of claim 6, wherein the main body (306) includes a transition portion (328) in the first inlet channel, the transition portion is designed to provide a smooth fluid flow channel.

10. The filter head of claim 6, wherein the second inlet channel of the adaptor (300) includes a wall (334) which defines an initial fluid flow profile (330) and a final fluid flow profile (332), separated by a transition portion (336), the final fluid flow profile is substantially cylindrical in shape.

11. The filter head of claim 6, wherein the adaptor (300) includes a main body portion (338) having a flat planar surface (340), the main body portion and flat planar surface define an extension portion (342), the main body (338) includes holes (304) and the main body (306) of the filter head (202) includes holes (318), wherein pairs of holes are aligned for receiving a respective screw (302).

12. The filter head of claim 6, wherein the adaptor (300) is formed by die cast.

13. The filter head of claim 6, wherein the adaptor (300) is plastic.

14. A compressed air filter comprising the filter head (202) of claim 6, a filter element (16) and filter body (204).

\* \* \* \* \*